(12) United States Patent
Costello

(10) Patent No.: US 9,194,101 B2
(45) Date of Patent: Nov. 24, 2015

(54) METHOD AND APPARATUS FOR EARTH MOVING AND SURFACE GRADING

(71) Applicant: Gregory P. Costello, Lakeland, LA (US)

(72) Inventor: Gregory P. Costello, Lakeland, LA (US)

( * ) Notice: Subject to any disclaimer, the term of this patent is extended or adjusted under 35 U.S.C. 154(b) by 0 days.

(21) Appl. No.: 14/688,063

(22) Filed: Apr. 16, 2015

(65) Prior Publication Data

US 2015/0299980 A1 Oct. 22, 2015

Related U.S. Application Data

(60) Provisional application No. 61/980,657, filed on Apr. 17, 2014, provisional application No. 62/006,486, filed on Jun. 2, 2014.

(51) Int. Cl.
*E02F 3/76* (2006.01)
*E02F 3/84* (2006.01)
*E02F 9/22* (2006.01)

(52) U.S. Cl.
CPC .............. *E02F 3/844* (2013.01); *E02F 9/2296* (2013.01)

(58) Field of Classification Search
CPC ...... A01B 3/464; A01B 3/4215; A01B 63/32; A01B 73/00; A01B 73/02; A01D 78/1007; E02F 3/7618; E02F 3/764; E02F 3/765; E02F 3/845; E02F 3/844; E02F 9/2296
USPC ........ 172/2–11, 212, 225, 776–781, 819–826
See application file for complete search history.

(56) References Cited

U.S. PATENT DOCUMENTS

| | | | | |
|---|---|---|---|---|
| 3,896,899 | A * | 7/1975 | Scholl | 172/4.5 |
| 4,603,745 | A * | 8/1986 | Watvedt | 172/212 |
| 4,825,958 | A * | 5/1989 | Kelderman | 172/413 |
| 5,769,768 | A * | 6/1998 | Polacek et al. | 483/55 |
| 6,105,682 | A * | 8/2000 | Recker et al. | 172/811 |
| 6,286,606 | B1 * | 9/2001 | Krieg et al. | 172/4.5 |
| 7,926,247 | B2 * | 4/2011 | Van Den Engel | 56/15.9 |

* cited by examiner

*Primary Examiner* — Robert Pezzuto
(74) *Attorney, Agent, or Firm* — Ted M. Anthony

(57) ABSTRACT

A tandem system having multiple fluid-powered cylinders for operation of motor graders and other earth-moving equipment that is capable of interfacing with and being controlled by conventional two dimensional ("2-D") and three dimensional ("3-D") grade control systems, responds to encountered grade changes and adjusts elevation and a cross-slope to match predetermined project design specifications. Each cylinder member has at least one master area and at least one slave area.

18 Claims, 4 Drawing Sheets

METHOD AND APPARATUS FOR EARTH MOVING AND SURFACE GRADING

CROSS REFERENCES TO RELATED APPLICATION

Priority of U.S. Provisional Patent Application Ser. No. 61/980,657, filed Apr. 17, 2014, and U.S. Provisional Patent Application Ser. No. 62/006,486, filed Jun. 2, 2014, both incorporated herein by reference, is hereby claimed.

STATEMENTS AS TO THE RIGHTS TO THE INVENTION MADE UNDER FEDERALLY SPONSORED RESEARCH AND DEVELOPMENT

None

BACKGROUND OF THE INVENTION

1. Field of the Invention

The present invention pertains to a tandem control and operating assembly for use in achieving a desired grade (including, without limitation, a precise final grade) on a variety of earth moving applications. More particularly, the present invention pertains to a tandem phasing hydraulic assembly for use in elevation and cross-slope tilt control on earth moving equipment, using a 2-D (two dimensional) or 3-D (three dimensional) machine control grading system.

2. Brief Description of the Related Art

Earth-moving projects can encompass a wide variety of excavating, trenching, boring, scraping, spreading and other tasks, which are performed in connection with road-building, infrastructure improvements, construction, mining and other activities. During earth-moving operations, a wide variety of equipment can be used for specific applications. Such equipment can include, without limitation, excavators, backhoes, bulldozers, loaders and motor graders.

One such earth-moving process is commonly referred to as "grading." Grading is frequently used during construction operations in order to create a smooth base having a designed surface slope. The grading process is typically used in connection with many different earth-moving projects including, without limitation, construction or reconditioning of sports fields, planar and non-planar commercial parking areas, residential subdivisions, roadways, agricultural areas and the like. Design parameters such as water runoff, slope, compaction (typically for load-bearing capacity) and thicknesses of various material layers, represent important grading and site design criteria.

In most instances, such grading operations typically involve a combination of "cutting" (that is, removal of earth or other materials) and "filling" (that is, placement of earth or other materials) operations that are required in order to achieve a final grading plan. During grading operations, cut and fill quantities are preferably beneficially balanced in order to avoid inefficiencies associated with obtaining additional fill material or removing excess material.

During grading and other earth-moving operations, mobile equipment generally must be steered and/or otherwise guided within a particular jobsite, while the working components of such equipment (such as, for example, blades, buckets and/or ground-engaging tools) must be controlled through their respective ranges of motion. Such steering, guidance and control have historically been accomplished by human operators; such human operators typically require relatively high levels of skill, training and experience for achieving desired results piloting such earth-moving equipment.

More recently, three-dimensional machine controlled guidance systems have been developed in order to provide automated control of such earth moving equipment. Such machine controlled guidance technology can be used to reduce human control, thereby increasing earth-moving efficiency and overall job quality. In many instances, such technology utilizes a global positioning system ("GPS"), as well as other measurement control systems, in order to automatically guide and control equipment used to place, level and/or compact dirt and other materials.

So-called "fully automatic" three-dimensional machine controlled guidance systems permit automated operation of earth moving equipment, as well as the working components thereof, in order to conform to a predetermined site plan. Such site plan, typically created by an engineering or other design firm, can be imported into said three-dimensional machine controlled guidance system. Thereafter, said earth moving equipment and the associated working components can be automatically controlled and oriented in order to move dirt or other materials to match said predetermined site plan.

Generally, cutting edges of earth-moving equipment are positioned using fluid-powered (typically hydraulic) drive cylinders. Such drive cylinders are used to move blades and other working components up and down, and to adjust vertical and horizontal angles of such blades and other components. With fully automatic three-dimensional machine controlled guidance systems, control fluid for such drive cylinders is directed to and from said cylinders using electrically actuated servo-type valves which, in turn, are controlled by a computer-driven operating system.

Onboard computers and operating software can utilize satellite GPS positioning information, as well as predetermined design data, in order to guide earth-moving equipment around a job site and automatically adjust positioning of working components of such equipment. Sonic and/or laser sensors can also be used to provide information, such as distance, elevation or proximity measurement, to said three-dimensional machine controlled guidance systems. Such information is provided to computer processor(s) which process such information and electronically control said servo valves which, in turn, control fluid powered drive cylinders. In this manner, cutting edge(s) of working components can be automatically moved or adjusted to match predetermined job parameters.

Unfortunately, conventional earth moving devices equipped with double action fluid-powered drive cylinders suffer from some significant limitations. Such conventional cylinders typically include a relatively large number of moving parts that eventually wear or fail, including, but not limited to, pivot pins, bushings, bearings, hoses, and hydraulic fittings. Such failures generally give rise to costly down time and a frequent need for expensive and time consuming repairs.

Further, conventional double action drive cylinders are generally supplied with fluid from a common fluid supply conduit; such fluid passes through a flow divider that is designed to split such fluid flow volume in a desired proportion (frequently, 50/50) between multiple cylinders. However, when earth moving equipment is subjected to uneven loading, such divided fluid flow will typically take a path of least resistance, causing said fluid split to deviate from said desired proportion. As a result, such conventional fluid-powered double action drive cylinders are especially prone to failure when installed on scrapers and/or other earth moving equipment exposed to uneven distribution of dirt or other earth material and, thus, uneven loading.

Thus, there is a need for a robust earth moving assembly equipped with fluid-powered cylinders capable of providing consistency, accuracy and repeatability in operation. Said earth moving assembly should beneficially utilize less moving parts than conventional equipment, thereby providing for a more durable and effective solution to earth moving applications.

SUMMARY OF THE INVENTION

The present invention comprises a tandem phasing assembly having a plurality of fluid powered work cylinder members. Although other fluid can be used, in a preferred embodiment said cylinder members are hydraulically powered. Each of said fluid-powered cylinder member has a compact configuration and is capable of both elevation and a cross-slope control that is independent of other fluid-powered cylinder member(s).

The configuration of the fluid-powered cylinder members of the present invention significantly reduces the number of moving parts, as compared to conventional systems, that are susceptible to wear or failure, including, but not limited to, pivot pins, bushings, bearings, hoses, and hydraulic fittings, thereby eliminating a need for expensive repairs and frequent down time.

In a preferred embodiment, each cylinder member has at least one barrel member and a piston rod member slidably disposed within each of said at least one barrel members. Said rod members permit said cylinder members to operate independently of one another which, in turn, permits working components of associated earth moving equipment to have a desired orientation including, without limitation, a steep and aggressive tilt.

In a preferred embodiment, the tandem phasing assembly of the present invention is capable of interfacing with conventional two dimensional ("2-D") and three dimensional ("3-D") grade control systems that are currently available. Said tandem phasing assembly of the present invention responds to encountered grade changes from such a control system as an earth mover traverses across terrain and adjusts elevation and a cross-slope to match predetermined project design specifications.

In a preferred embodiment, each of said cylinder members of the present invention comprises at least one master area and at least one slave area. A hydraulic fluid communication conduit between said at least one master and said at least one slave areas permits earth moving equipment to maintain precise elevation and slope demands, even with a heavy one-sided material loading. Conventional double acting cylinders can routinely fail under such conditions.

In an alternative embodiment, the tandem phasing assembly comprises an active cylinder member on one side and a blanked-out cylinder member on an opposite side. Said blanked-out, inactive cylinder member of said alternate embodiment does not have a piston rod member located within the inactive cylinder member, resulting in less overall tilting capacity. As such, said alternative embodiment can be used when a less aggressive tilt is necessary for earth moving operations (such as, for example, agricultural applications). Additionally, said blanked-out cylinder can beneficially include a stepped-down or multi-dimensioned butt-plate.

When the tandem phasing hydraulics assembly of the present invention is utilized in connection with a bottomless drag scraper, material can be moved across a surface being graded, while said scraper is able to maintain a full load. Therefore, the present invention represents a significant improvement over conventional dozers and road grading equipment which frequently lose or waste material during operation because they do not have side walls to contain material.

BRIEF DESCRIPTION OF THE DRAWINGS/FIGURES

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

DETAILED DESCRIPTION OF A PREFERRED EMBODIMENT

Figure 1:
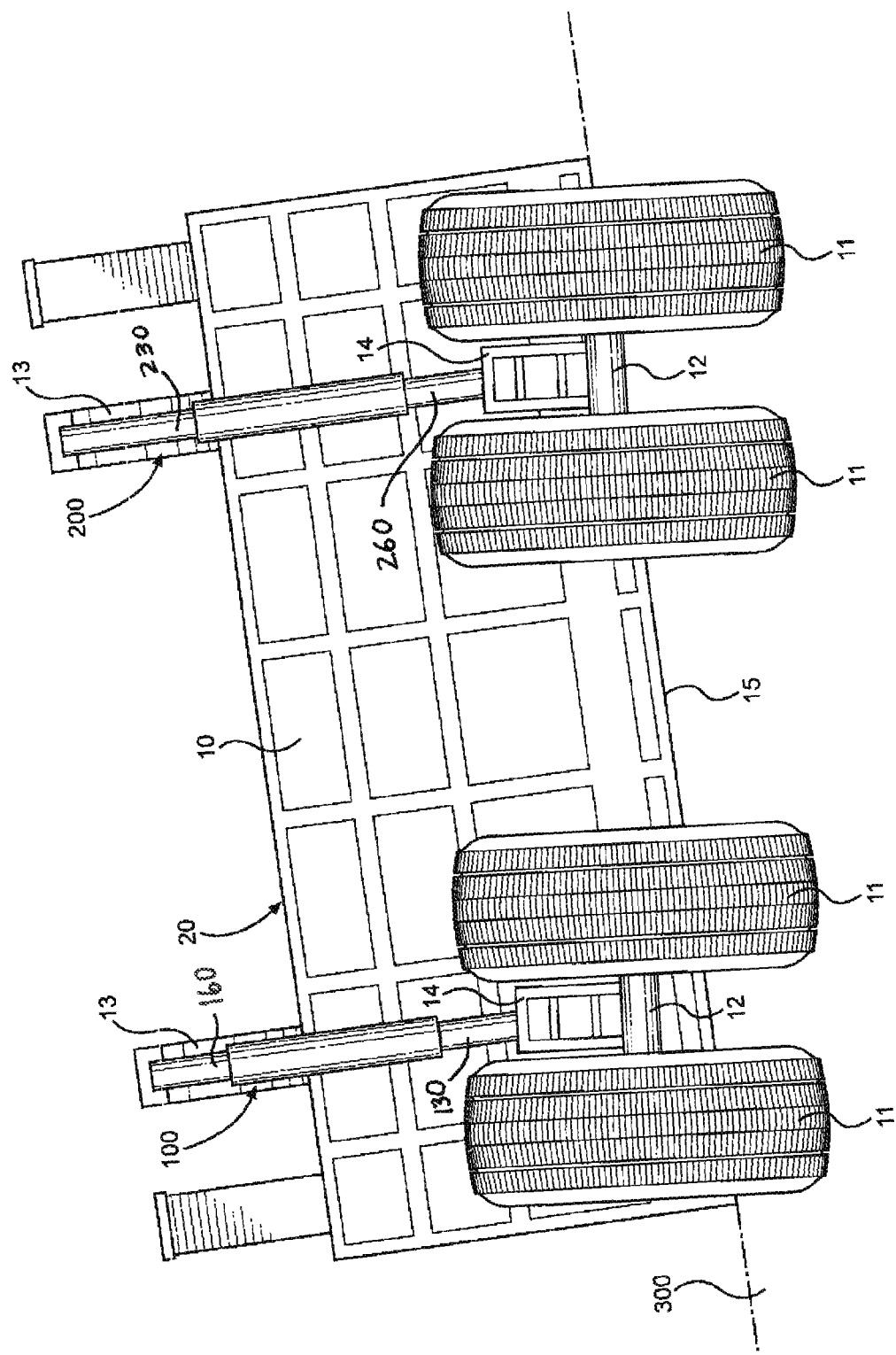
FIG. 1 depicts a rear view of an earth moving grader assembly equipped with the tandem phasing cylinder assembly of the present invention.

FIG. 1 depicts a rear view of a conventional grader assembly 20 equipped with the tandem phasing cylinder assembly of the present invention. As depicted in FIG. 1, said conventional grader assembly generally comprises a grader blade 10. Vertical mounting posts 13 extend generally upward from said blade member 10, while tires 11 are rotationally mounted to axles 12. Mounting brackets 14 are operationally attached to said axles 12.

A first fluid-powered cylinder assembly 100 has an upper end and a lower end. Said upper end of said first fluid-powered cylinder 100 is operationally attached to a mounting post 13, while said lower end is operationally attached to a mounting bracket 14. Similarly, a second fluid-powered cylinder assembly 200 has an upper end and a lower end. Said upper end of said first fluid-powered cylinder 200 is operationally attached to a mounting post 13, while said lower end is operationally attached to a mounting bracket 14.

Still referring to FIG. 1, blade member 10 (and, more particularly, lower cutting edge 15 thereof) is disposed on an underlying surface 300. In most applications, surface 300 can be a job site or other location which at which dirt or other sediment is being moved or reconfigured. Both first fluid powered cylinder 100 and second fluid powered cylinder 200 can be extended or retracted as discussed in greater detail below. Such extension or retraction of said first and/or second fluid powered cylinders permits blade member 10 to be selectively raised or lowered relative to underlying surface 300, as well as being tilted from side to side.

Figure 2:
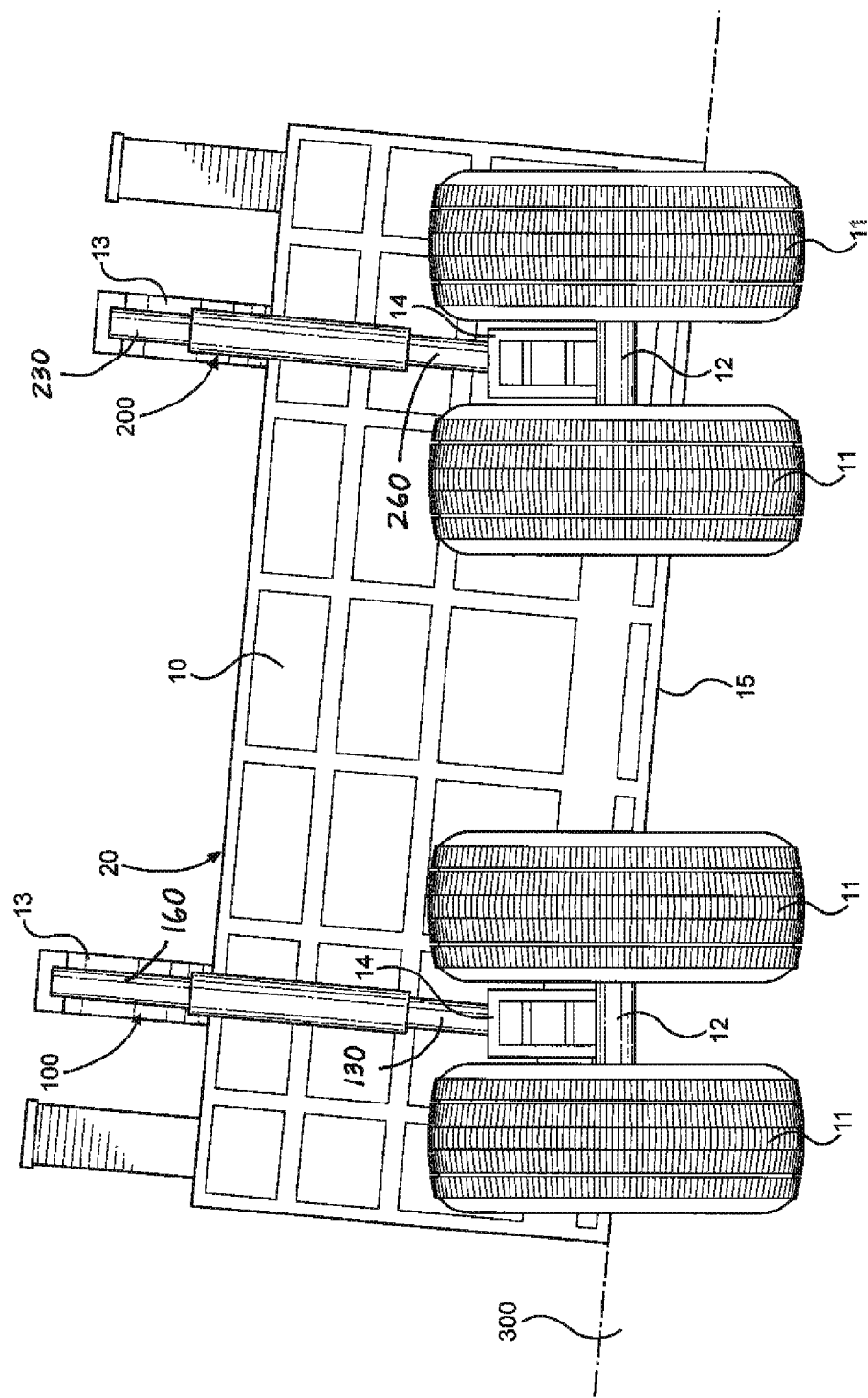
FIG. 2 depicts an alternative rear view of an earth moving grader assembly equipped with the tandem phasing cylinder assembly of the present invention.

FIG. 2 depicts an alternative rear view of a grader assembly 20 equipped with the tandem phasing cylinder assembly of the present invention. As noted above, both first fluid powered cylinder 100 and second fluid powered cylinder 200 can be extended or retracted which, in turn, permits blade member 10 to be selectively raised or lowered relative to surface 300, as well as being tilted from side to side. Blade member 10 is tilted in the opposite side-to-side direction relative to underlying surface 300 as compared to the orientation depicted in FIG. 1.

Figure 3:
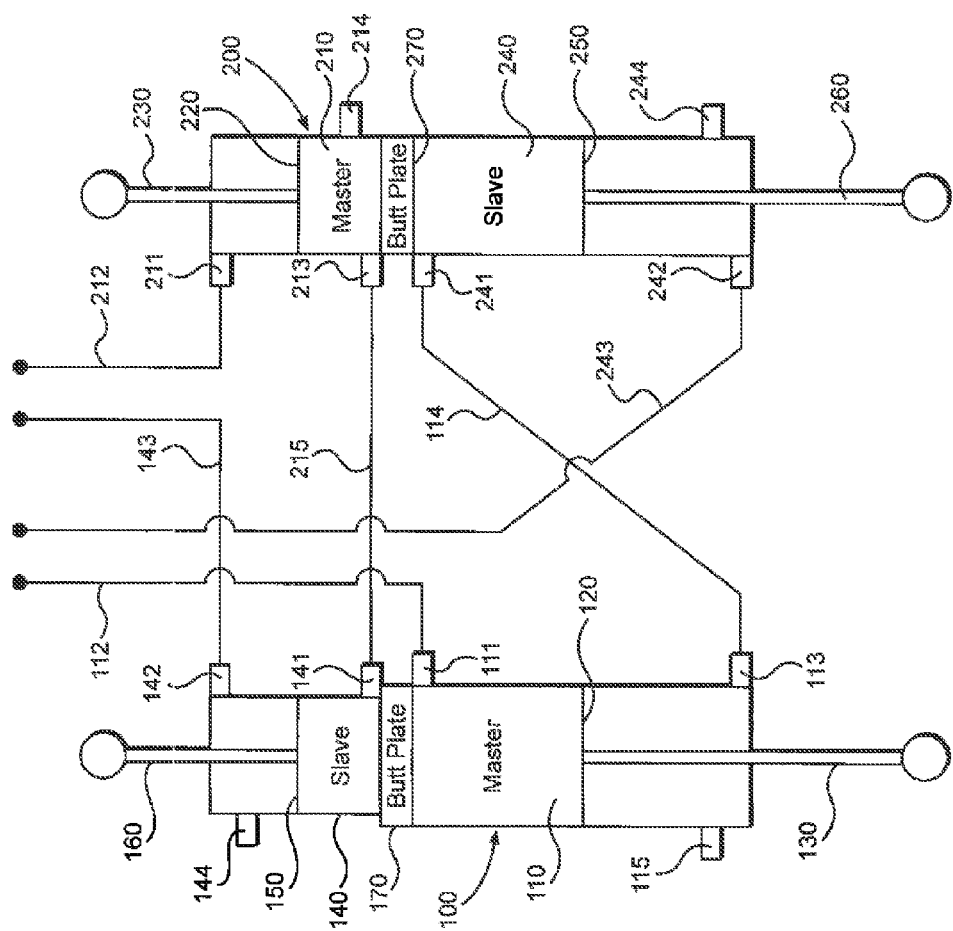
FIG. 3 depicts a schematic view of a hydraulic system of the present invention.

FIG. 3 depicts a schematic view of a hydraulic system of the tandem phasing cylinder assembly of the present invention. As noted above, said tandem phasing cylinder assembly can comprise a plurality of fluid powered cylinders that can be selectively extended or retracted. Although other control fluid could be used to power said cylinders, in a preferred embodiment said cylinders are powered using hydraulic fluid.

Still referring to FIG. 3, first cylinder assembly 100 comprises a master barrel member 110 and a slave barrel member 140, each of which define inner cylindrical chambers. Said master barrel member 110 and slave barrel member 140 are fluidly isolated from each other by butt plate 170. Master piston 120, operationally connected to master piston rod 130, is slidably disposed within said inner chamber formed by master barrel 110. Similarly, slave piston 150, operationally connected to slave piston rod 160, is slidably disposed within said inner chamber formed by slave barrel 140.

Second cylinder assembly 200 comprises a master barrel member 210 and a slave barrel member 240, each of which define inner cylindrical chambers. Said master barrel member 210 and slave barrel member 240 are fluidly isolated from each other by butt plate 270. Master piston 220, operationally connected to master piston rod 230, is slidably disposed within said inner chamber formed by master barrel 210; slave piston 250, operationally connected to slave piston rod 260, is slidably disposed within said inner chamber formed by slave barrel 240.

During operation, hydraulic fluid is provided to first cylinder assembly 100 via conduit 112. Although specific configurations can vary, it is to be observed that said conduit 112 can extend from a hydraulic fluid pump supplied by a hydraulic fluid reservoir well known to those having skill in the art. Said fluid is supplied through fluid conduit 112 into the inner chamber of master barrel 110 via fluid inlet fitting 111. As said fluid volume varies within master barrel 110, master piston 120 moves within said master barrel 110, thereby causing master piston rod 130 to extend or retract relative to said master barrel 110.

As more fluid enters said inner chamber of master barrel 110, master piston 120 forces fluid to flow out of fluid fitting 113 and through fluid conduit 114. Fluid supplied through fluid conduit 114 enters into the inner chamber of slave barrel 240 via fluid inlet fitting 241. As said fluid volume varies within the inner chamber of slave barrel 240, slave piston 250 moves within said slave barrel 240, thereby causing slave piston rod 260 to extend or retract relative to said slave barrel 240. As more fluid enters said inner chamber of slave barrel 240 via fluid fitting 241, slave piston 250 forces fluid to flow out of fluid fitting 242 and through fluid conduit 243; said fluid is ultimately directed back to a hydraulic fluid reservoir utilized by an operating control system.

Similarly, during operation, hydraulic fluid is likewise selectively provided to second cylinder assembly 200 via conduit 212. Although specific configurations can vary, it is to be observed that said conduit 212 can extend from a hydraulic fluid pump supplied by a hydraulic fluid reservoir well known to those having skill in the art. Said fluid is supplied through fluid conduit 212 into the inner chamber of master barrel 210 of second cylinder member 200 via fluid inlet fitting 211. As said fluid volume varies within master barrel 210, master piston 220 moves within said master barrel 210, thereby causing master piston rod 230 to extend or retract relative to said master barrel 210.

As more fluid enters said inner chamber of master barrel 210, master piston 220 forces fluid out of fluid fitting 213 and through fluid conduit 215. Fluid supplied through fluid conduit 215 enters into the inner chamber of slave barrel 140 of first fluid cylinder assembly 100 via fluid inlet fitting 141. As said fluid volume varies within the inner chamber of slave barrel 140, slave piston 150 moves within said slave barrel 140, thereby causing slave piston rod 160 to extend or retract relative to said slave barrel 140. As more fluid enters said inner chamber of slave barrel 140, slave piston 150 forces fluid out of fluid fitting 142 and through fluid conduit 143; said fluid is ultimately directed back to a hydraulic fluid reservoir utilized by an operating control system.

Figure 4:
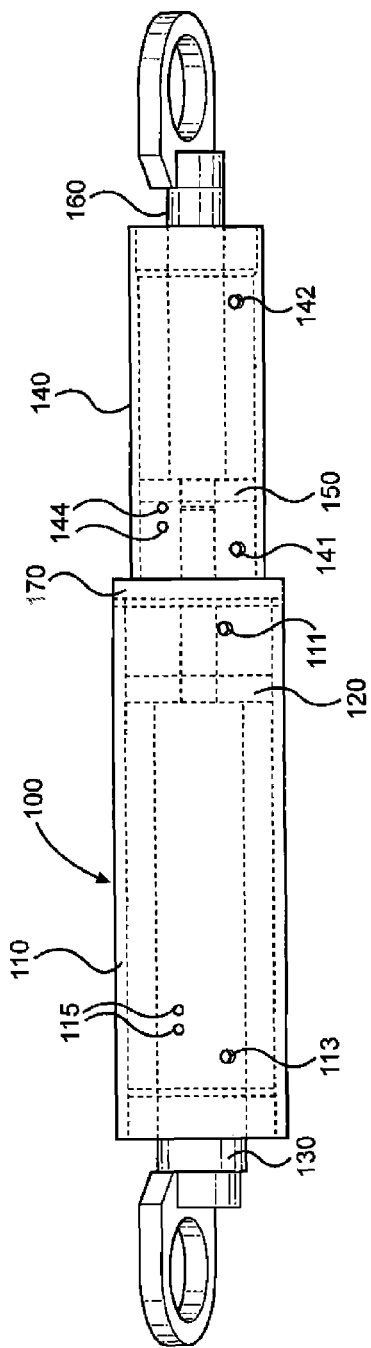
FIG. 4 depicts a side sectional view of a first embodiment fluid-powered cylinder of the present invention.

FIG. 4 depicts a side sectional view of a first embodiment fluid-powered cylinder 100 of the present invention. First cylinder assembly 100 comprises a master barrel member 110 and a slave barrel member 140, each of which define inner cylindrical chambers. Said master barrel member 110 and slave barrel member 140 are fluidly isolated from each other by butt plate 170. Master piston 120, operationally connected to master piston rod 130, is slidably disposed within said inner chamber formed by master barrel 110. Similarly, slave piston 150, operationally connected to slave piston rod 160, is slidably disposed within said inner chamber formed by slave barrel 140.

Figure 5:
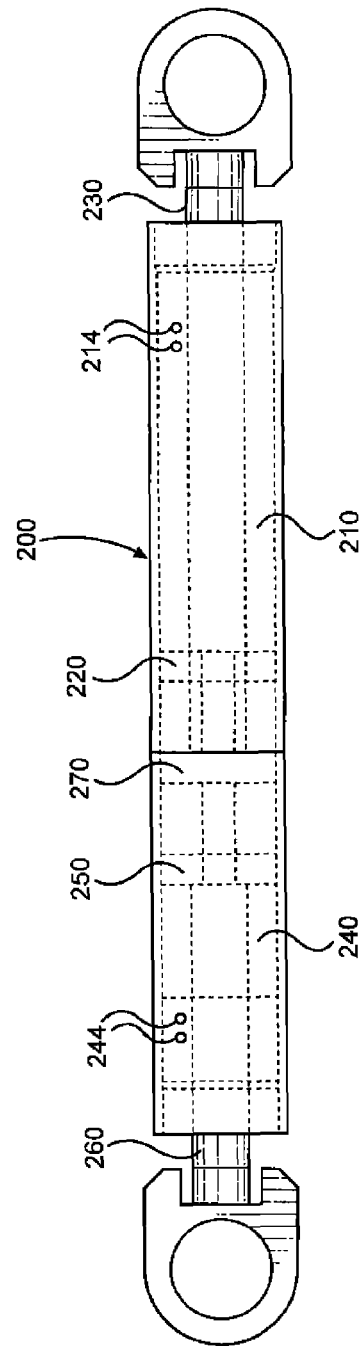
FIG. 5 depicts a side sectional view of a second embodiment fluid-powered cylinder of the present invention.

FIG. 5 depicts a side sectional view of a second embodiment fluid-powered cylinder of the present invention. Second cylinder assembly 200 comprises a master barrel member 210 and a slave barrel member 240, each of which define inner cylindrical chambers. Said master barrel member 210 and slave barrel member 240 are fluidly isolated from each other by butt plate 270. Master piston 220, operationally connected to master piston rod 230, is slidably disposed within said inner chamber formed by master barrel 210; slave piston 250, operationally connected to slave piston rod 260, is slidably disposed within said inner chamber formed by slave barrel 240.

Referring back to FIGS. 1 and 2, first fluid-powered cylinder assembly 100 has an upper end and a lower end. Said upper end of said first fluid-powered cylinder 100 is operationally attached to a mounting post 13, while said lower end is operationally attached to a mounting bracket 14. Second fluid-powered cylinder assembly 200 has an upper end and a lower end. Said upper end of said first fluid-powered cylinder 200 is operationally attached to a mounting post 13, while said lower end is operationally attached to a mounting bracket 14. Blade member 10 (and, more particularly, lower cutting edge 15 thereof) is disposed on an underlying surface 300.

During operation, master rod 130 of first fluid powered cylinder 100 and slave rod 260 of second fluid powered cylinder 200 can be extended or retracted as desired. Such extension or retraction of said first and/or second fluid powered cylinder rods permits blade member 10 to be selectively raised or lowered relative to underlying surface 300. Similarly, slave rod 160 of first fluid powered cylinder 100 and master rod 230 of second fluid powered cylinder 200 can be extended or retracted as desired. Such extension or retraction of said cylinder rods permits blade member 10 to be selectively tilted from side-to-side relative to underlying surface 300.

Although other configurations can be envisioned without departing from the scope of the present invention, as depicted in FIGS. 1 and 2, master rod 130 of first fluid powered cylinder 100 and slave rod 260 of second fluid powered cylinder 200 control blade elevation, while slave rod 160 of first fluid powered cylinder 100 and master rod 230 of second fluid powered cylinder 200 control blade side-to-side tilt.

The tandem phasing hydraulic assembly of the present invention consistently maintains a condition of having an exact elevation and slope demand, even with a heavy, one-sided material load on a blade. By contrast, conventional double-action cylinders are highly susceptible to failure under such uneven loading condition. As a result, the tandem phasing hydraulic assembly of the present invention is faster and can move more material over a longer distance than a conventional dozer or motor grader, even though said conventional dozers and motor graders may be equipped with an identical machine control system. In other words, tandem phasing hydraulic assembly of the present invention can be used with conventional machine control systems.

Further, the tandem phasing hydraulic assembly of the present invention can have multiple alternative embodiments or configurations in order to accommodate a variety of ground surface conditions and/or intended uses. For example, in subdivision or road grading, the tandem phasing hydraulic assembly of the present invention can have a plurality of active cylinders that operate independently from one another that move in an upward and downward motion, thereby providing a steep tilt. Alternatively, in an agricultural context, the tandem phasing hydraulic assembly of the present invention can have an active cylinder on one side and a blanked-out, inactive cylinder on an opposite side, thereby providing only half of the tilt when a less aggressive tilt is needed.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed is:

1. An apparatus for controlling earth moving equipment comprising:
   a) a first fluid powered cylinder assembly having a master cylinder area and a slave cylinder area;
   b) a second fluid powered cylinder assembly having a master cylinder area and a slave cylinder area;
   c) a first conduit connecting an outlet of said master cylinder area of said first fluid powered cylinder assembly with an inlet of said slave cylinder area of said second fluid powered cylinder assembly, wherein fluid flowing out of said master cylinder area of said first cylinder flows into said slave cylinder area of said second cylinder, and wherein said master cylinder of said first cylinder and said slave cylinder of said second cylinder operate in tandem phased relationship; and
   d) a second conduit connecting an outlet of said master cylinder area of said second fluid powered cylinder assembly with an inlet of said slave cylinder area of said first fluid powered cylinder assembly, wherein fluid flowing out of said master cylinder area of said second cylinder flows into said slave cylinder area of said first cylinder, and wherein said master cylinder of said second cylinder and said slave cylinder of said first cylinder operate in tandem phased relationship.

2. The apparatus of claim 1, wherein said first and second cylinder assemblies are disposed on an earth moving machine having a blade.

3. The apparatus of claim 2, wherein said first fluid cylinder assembly has a first end and a second end, and wherein said first end of said first cylinder assembly is operationally connected to said earth moving machine and said second end is operationally connected to said blade.

4. The apparatus of claim 3, wherein said second cylinder assembly has a first end and a second end, and wherein said first end of said second cylinder assembly is operationally connected to said earth moving machine and said second end is operationally connected to said blade.

5. The apparatus of claim 4, wherein said master cylinder of said first cylinder assembly and said slave cylinder of said second cylinder assembly are adapted to operate in tandem phased relationship to adjust the elevation of said blade relative to an underlying surface.

6. The apparatus of claim 4, wherein said slave cylinder of said first cylinder assembly and said master cylinder of said second cylinder assembly are adapted to operate in tandem phased relationship to change side-to-side tilt of said blade relative to an underlying surface.

7. An apparatus for controlling the positioning of a blade of an earth moving machine comprising:
   a) a first fluid powered cylinder assembly comprising:
      i) a first master cylinder barrel defining an inner chamber, and having a fluid inlet and a fluid outlet;
      ii) a first master piston moveably disposed within said first master cylinder barrel;
      iii) a first master rod operationally connected to said first master piston;
      iv) a first slave cylinder barrel defining an inner chamber, and having a fluid inlet and a fluid outlet;
      v) a first slave piston moveably disposed within said first slave cylinder barrel;
      vi) a first slave rod operationally connected to said first slave piston;
      vii) a first plate isolating said first master cylinder barrel from said first slave cylinder barrel;
   b) a second fluid powered cylinder assembly comprising:
      i) a second master cylinder barrel defining an inner chamber, and having a fluid inlet and a fluid outlet;
      ii) a second master piston moveably disposed within said second master cylinder barrel;
      iii) a second master rod operationally connected to said second master piston;
      iv) a second slave cylinder barrel defining an inner chamber, and having a fluid inlet and a fluid outlet;
      v) a second slave piston moveably disposed within said second slave cylinder barrel;
      vi) a second slave rod operationally connected to said second slave piston;
      vii) a second plate isolating said second master cylinder barrel from said second slave cylinder barrel;
   c) a first conduit connecting said fluid outlet of said first master cylinder barrel of said first fluid powered cylinder assembly with said fluid inlet of said second slave cylinder barrel of said second fluid powered cylinder assembly, wherein fluid flowing out of said master cylinder barrel of said first cylinder assembly flows into said slave cylinder barrel of said second cylinder assembly, and wherein said master rod of said first cylinder assembly and said slave rod of said second cylinder assembly operate in tandem phased relationship; and
   d) a second conduit connecting said fluid outlet of said second master cylinder barrel of said second fluid powered cylinder assembly with said fluid inlet of said first slave cylinder barrel of said first fluid powered cylinder assembly, wherein fluid flowing out of said master cylinder barrel of said second cylinder assembly flows into said slave cylinder barrel of said first cylinder assembly, and wherein said master rod of said second cylinder assembly and said slave rod of said first cylinder assembly operate in tandem phased relationship.

8. The apparatus of claim 7, wherein said first cylinder assembly has a first end and a second end, and wherein said first end of said first cylinder assembly is operationally connected to said earth moving machine and said second end is operationally connected to said blade.

9. The apparatus of claim 8, wherein said second cylinder assembly has a first end and a second end, and wherein said first end of said second cylinder assembly is operationally connected to said earth moving machine and said second end is operationally connected to said blade.

10. The apparatus of claim 7, wherein said master rod of said first cylinder assembly and slave rod of said second cylinder assembly are adapted to operate in tandem phased relationship to adjust the elevation of said blade relative to an underlying surface.

11. The apparatus of claim 7, wherein said slave rod of said first cylinder assembly and master rod of said second cylinder assembly are adapted to operate in tandem phased relationship to adjust side-to-side tilt of said blade relative to an underlying surface.

12. The apparatus of claim 7, further comprising a first supply conduit adapted to supply fluid to said first master cylinder barrel.

13. The apparatus of claim 12, wherein flow of said fluid through said first supply conduit is controlled by a servo valve.

14. The apparatus of claim 7, further comprising a second supply conduit adapted to supply fluid to said second master cylinder barrel.

15. The apparatus of claim 14, wherein flow of said fluid through said second supply conduit is controlled by a servo valve.

16. The apparatus of claim 7, wherein said earth moving machine comprises a motor grader.

17. The apparatus of claim 7, wherein said first master cylinder barrel and said first slave cylinder barrel each have a plurality of re-phasing ports.

18. The apparatus of claim 7, wherein said second master cylinder barrel and said second slave cylinder barrel each have a plurality of re-phasing ports.

* * * * *